United States Patent
Piesker (10) Patent No.: US 8,313,062 B2
(45) Date of Patent: Nov. 20, 2012

(54) EXTENDABLE DEFLECTOR FOR DISCHARGING STRUCTURE-DAMAGING FLUIDS

(75) Inventor: Markus Piesker, Lueneburg (DE)

(73) Assignee: Airbus Operations GmbH (DE)

( * ) Notice: Subject to any disclaimer, the term of this patent is extended or adjusted under 35 U.S.C. 154(b) by 294 days.

(21) Appl. No.: 12/534,997

(22) Filed: Aug. 4, 2009

(65) Prior Publication Data

US 2010/0032525 A1 Feb. 11, 2010

Related U.S. Application Data

(60) Provisional application No. 61/188,408, filed on Aug. 8, 2008.

(30) Foreign Application Priority Data

Aug. 8, 2008 (DE) .......................... 10 2008 037 142

(51) Int. Cl.
*B64D 1/00* (2006.01)

(52) U.S. Cl. ... 244/136; 244/94; 244/135 R; 244/135 A; 244/135 C (58) Field of Classification Search .................. 244/136, 244/135 R, 135 C, 135 A, 94
See application file for complete search history.

(56) References Cited

U.S. PATENT DOCUMENTS

| | | | | |
|---|---|---|---|---|
| 2,117,234 A | * | 5/1938 | Austin et al. .................... 244/94 |
| 2,138,970 A | * | 12/1938 | Jones .......................... 244/135 R |
| 2,247,406 A | * | 7/1941 | Raymond .................. 244/135 R |
| 2,248,308 A | * | 7/1941 | Rice .......................... 244/135 R |
| 2,573,207 A | * | 10/1951 | Lipman ...................... 244/135 R |
| 2,880,749 A | * | 4/1959 | Brown ........................ 137/899.2 |
| 3,089,677 A | * | 5/1963 | Savaria ............................ 251/58 |
| 4,253,626 A | * | 3/1981 | Muscatell ................. 244/135 R |
| 4,441,673 A | * | 4/1984 | Muscatell ................. 244/135 R |
| 4,624,426 A | * | 11/1986 | Muscatell ................. 244/135 R |
| 4,804,157 A | * | 2/1989 | Muscatell ................. 244/135 R |
| 5,746,397 A | * | 5/1998 | DeField et al. ........... 244/135 R |

* cited by examiner

*Primary Examiner* — Tien Dinh
*Assistant Examiner* — Justin Benedik
(74) *Attorney, Agent, or Firm* — Lerner, David, Littenberg, Krumholz & Mentlik, LLP

(57) ABSTRACT

The invention relates to a deflector for an aircraft, comprising a discharge pipe for leading a fluid to be drained from the aircraft by way of an outlet end to the environment of the aircraft; an actuator, coupled to the discharge pipe, for swinging out, when required, the discharge pipe to at least one activation position, wherein in the activation position the outlet end is arranged so as to be spaced apart from the exterior skin of the aircraft, and the deflector guides the fluid to be drained so that it exits outside a flow boundary layer that is present on the exterior skin. The deflector according to the invention is activated when required and is able to discharge structure-damaging fluids to the environment in such a way that the exterior structure of the aircraft does not become wet, and at the same time the deflector according to the invention, normally accommodated within the contour of the aircraft, does not result in any additional aerodynamic resistance.

16 Claims, 11 Drawing Sheets

EXTENDABLE DEFLECTOR FOR DISCHARGING STRUCTURE-DAMAGING FLUIDS

CROSS-REFERENCE TO RELATED APPLICATIONS

This application claims the benefit of the filing date of U.S. Provisional Patent Application No. 61/188,408 filed Aug. 8, 2008, the disclosure of which is hereby incorporated herein by reference.

BACKGROUND OF THE INVENTION

The invention relates to a deflector for an aircraft, to the use of a deflector in an aircraft, and to a method for discharging fluids from an aircraft to the environment of the aircraft.

Hereinafter, the term "deflector" refers to devices and arrangements that are designed to discharge fluids from the interior of an aircraft to the environment. It is well known that fluids may be discharged by way of an outlet of an aircraft, wherein such an outlet is positioned so as to be flush with the exterior skin of the aircraft. Optionally, the outlet may be closed by means of a blind plug, wherein the blind plug may be pushed out as a result of the pressure of the discharging fluid. However, in the case of an outlet that is arranged so as to be flush with the exterior skin, any fluid to be discharged will contact the exterior skin of the aircraft in flight and thus render said skin wet. In the case of structure-damaging fluids, which cause particularly strong soiling, the danger of fire or the like, this manner of discharging fluid is not particularly advantageous.

To this effect in the state of the art so-called drainage masts are used, which are designed as rigid and permanently projecting pipes. The respective pipe is preferably aerodynamically enclosed in a fairing and is situated in the flow field of the aircraft so that the fluid to be released may not contact the exterior skin of the aircraft.

Figure 1A:
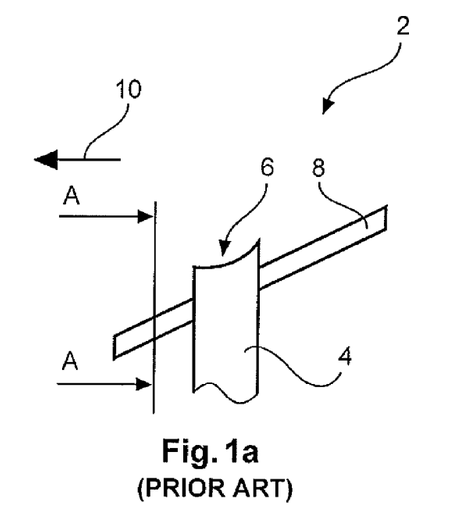
FIGS. 1a+b: a deflector from the state of the art, comprising a guiding plate and tube.
Figure 1B:
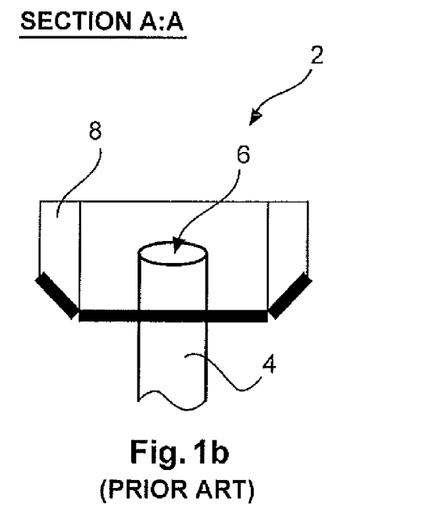
Figure 2A:
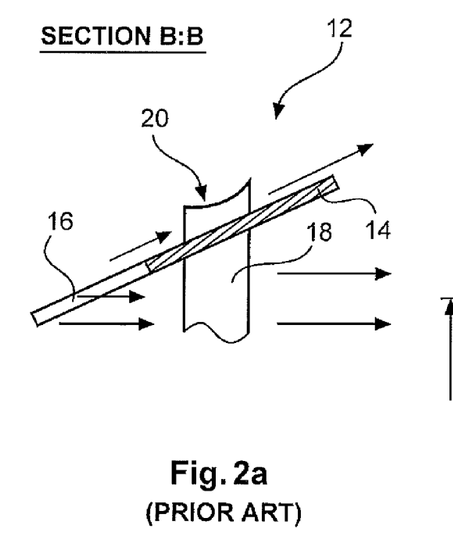
FIGS. 2a+b: a deflector from the state of the art comprising a cut-out guiding plate.
Figure 2B:
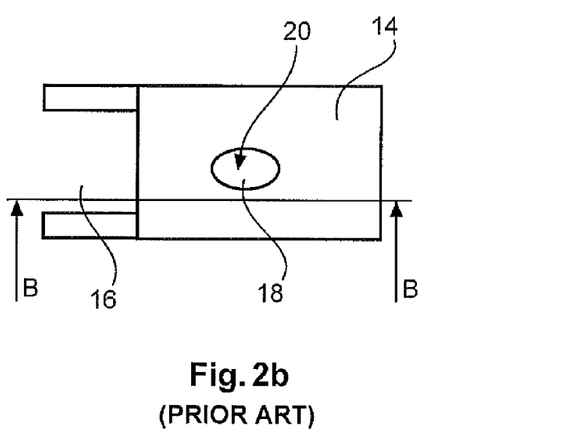

In addition, guiding plates according to FIGS. 1 and 2 exist, which are arranged rigidly obliquely in the flow field of the aircraft, through which guiding plates the discharging fluid is deflected away from the flow field so that a situation is avoided in which the fluid may contact the exterior structure of the aircraft.

Up to now, the discharge of structure-damaging gaseous fluids has been handled in various ways. Air conditioning outlets in aircraft discharge air with a relatively small increase in temperature so that this requires only minor arrangements in order to protect the structure. Oil cooler outlets of auxiliary power units (APUs) also only discharge air with a relatively small increase in temperature. In this case an exit opening comprising a relatively small titanium fairing is sufficient. Up to now, in aircraft, exhaust gases from auxiliary power units have been discharged at the rear of a tail cone, wherein this is a position in which the exhaust gas under any wind conditions and flight conditions no longer reaches the structure or the exterior skin of the aircraft at a concentration that would be sufficient to heat up the exterior skin of the aircraft.

However, exhaust outlets are also known that are arranged within the aerodynamic fairing of aircraft wings. In this region, as a result of wind and as a result of the aerodynamic conditions in flight operation, the so-called exhaust plume of the auxiliary power unit is pushed onto the structure or the exterior skin of the aircraft. However, there is the option of cooling the exhaust gas by means of extraneous air, as a result of which any deflector may be designed to be significantly smaller, or may even be done without entirely.

Due to the fact that various fluid sources may exist from which fluids need to be discharged, several deflectors may be necessary on an aircraft. However, various systems that drain the fluids may simply be coupled. In this way, liquids from various sources may be drained with the use of just one drainage mast. A fixed projecting drainage mast on an aircraft is more economical if said drainage mast is used for draining various sources.

Known systems for the discharge of gases may not, however, be used for other purposes or be coupled without further ado. Gas to be discharged would flood a pipe network used for coupling, which in the case of combustible gases could pose a risk. Furthermore, if an emergency system for discharging combustible gases is integrated in the aircraft, which emergency system is only seldom or never used, the resulting aerodynamic resistance is very significant. Without the use of a deflector that projects into the air flow, a combustible gas that is to be discharged would contact the exterior structure of the aircraft and would reach heated-up regions, for example engines or the like, thus compromising the safety of the aircraft.

The above-described deflectors from the state of the art are associated with a number of disadvantages, with the permanent projection of the deflector into the airflow surrounding the aircraft being particularly serious. As a result of it the aerodynamic resistance of the aircraft is permanently increased, which is unacceptable in view of aircraft design criteria to the contrary. Furthermore, none of the deflectors shown in the state of the art is specially designed for the discharge of combustible gases in emergencies, so that it would result in the smallest possible increase in aerodynamic resistance.

BRIEF SUMMARY OF THE INVENTION

It may therefore be an object of the invention to propose a deflector for discharging fluids from an aircraft, which deflector when required removes the fluids to be discharged as safely as possible away from the exterior structure of the aircraft without permanently increasing the flow resistance of the aircraft.

This object may be met by a deflector for an aircraft, comprising a discharge pipe for leading a fluid to be drained from the aircraft by way of an outlet end to the environment of the aircraft; an actuator, coupled to the discharge pipe, for swinging out, when required, the discharge pipe to at least one activation position, wherein in the activation position the outlet end is arranged so as to be spaced apart from the exterior skin of the aircraft; and the deflector guides the fluid to be discharged so that it exits outside a flow boundary layer that is present on the exterior skin.

By means of the combination comprising an actuator and a discharge pipe, in the manner described an advantageous deflector may be implemented which may be moved to a so-called activation position as needed only, in order to, at that position, release the fluid as safely as possible to the environment of the aircraft. During releasing or discharging of the fluid, the discharge pipe that may be swung out makes it possible for the fluid to be led out as far away from the exterior skin of the aircraft as possible. In this way a situation may safely be prevented where the fluids, which may be hazardous, for example combustible gases or liquids, reach the immediate flow along the exterior skin of the aircraft, where they might, further downstream, for example reach heated regions, engines or the like. To this effect the deflector according to the invention may be pivoted, extended or swung out, so that the deflector is normally arranged within the exterior structure of the aircraft. This design does not increase the aerodynamic resistance of the aircraft in the normal situation. When required, the deflector is activated automatically or by the pilot and quickly moves out of the structure in order to safely discharge the fluid to be discharged.

In an advantageous improvement of the deflector according to the invention, in its home position the discharge pipe is positioned within a contour of the aircraft, underneath a cover, which contour is flush with the contour of the aircraft. This provides an aerodynamically clean surface of the aircraft, by means of which any additional flow loss as a result of the deflector according to the invention is minimized or eliminated In a particularly advantageous improvement of the deflector according to the invention, the actuator comprises a piston that is axially slidably supported and that is designed to be moved by the fluid to be discharged, so as to extend the discharge pipe. This, in particular, obviates the need for active operation of the deflector, according to the invention, by the pilot or a member of the aircrew, or the need for expensive detection equipment comprising sensors and electronic control devices, so that as a result of this the deflector according to the invention may be designed so as to be simple, robust and reliable.

Furthermore, it is advantageous if the piston comprises indentations in which essentially at least one radially-movable slider is arranged which, when the activation position of the discharge pipe has been reached, locks into place in at least one corresponding indentation of a bushing that encloses the piston. This causes mechanically simple retention of the deflector according to the invention, and consequently a constant position of the deflector with constant flow characteristics in the surroundings or in the discharge pipe is provided.

Preferably, the piston comprises at least one through-opening that is positioned in such a way that in the home position of the deflector the at least one slider covers up the through-opening, and in the activation position uncovers the through-opening. Consequently, release of the fluid may take place only when the deflector is in the activation position, which prevents any premature release of fluid from negatively affecting the exterior structure of the aircraft.

Furthermore, it is particularly favourable if the actuator is reversible so that the discharge pipe may be moved to a home position by the actuator, wherein the cover is coupled to the actuator in such a way that when the discharge pipe is in the home position said cover is in a position so as to be flush with the exterior skin. Consequently, the increase in the aerodynamic resistance of the aircraft may be eliminated again after the fluid has been discharged.

It is particularly preferred if the deflector according to the invention comprises a guiding plate in order to let off into the flow field the fluid to be discharged in such a way that the exterior skin of the aircraft does not become wet. The guiding plate could, for example, be affixed to the discharge pipe, to a separate component, or it could also be implemented by the cover that for this purpose could be held so as to be hingeable. However, other forms of aerodynamic arrangements are also imaginable, which lead the fluid, which is to be discharged, away from the flow field and which are covered by the term "guiding plate".

In a preferred embodiment of the deflector according to the invention, the cover is movably held so as to uncover a receiving opening for the discharge pipe. This means that the cover does not require its own actuator or a mechanical coupling with the actuator of the discharge pipe in order to be opened. If the discharge pipe is extended or if the fluid to be discharged is discharged, the cover may be hinged open as a result of it being movably held, or it may be removed altogether. In this arrangement the cover may be guided by the deflector; it may, for example, lock at a defined position; or it may be opened, held open or closed with the assistance of wind pressure. Furthermore, the cover may also be pushed out completely so that it is lost. As a side effect the missing cover would indicate to ground personnel that the deflector was activated and that there was an emergency in a system.

In an advantageous embodiment of the deflector according to the invention, the cover is designed such that in a swung-out position it assumes the function of a guiding plate. For example, if the discharge pipe is swung out, and if in this process the cover is pushed open, the cover could be designed in such a way that when the discharge pipe is fully swung out said cover in an aerodynamically advantageous manner lets the airflow flow past the exterior skin of the aircraft at the outlet side of the discharge pipe in such a way that the fluid to be discharged may no longer find its way into the flow boundary layer on the exterior skin of the aircraft.

In an advantageous improvement of the deflector according to the invention, the cover may furthermore comprise ventilation slots to prevent any build-up of explosive gases in the home position of the discharge pipe.

Furthermore, it is particularly preferred if the cover for opening and/or closing is coupled with the actuator so that loss of the cover as a result of being pushed open may be prevented, and the deflector according to the invention with a re-closable cover eliminates the additional aerodynamic resistance.

Finally, it is also advantageous if the discharge pipe comprises at least one swivel joint and is equipped to be hinged, on the rotary axis, to the activation position. Consequently, the required installation space becomes flatter, and the deflector according to the invention projects relatively little into the interior of the aircraft.

Furthermore, it is advantageous if the slider is slidably held in at least one groove that extends parallel to the longitudinal axis of the piston, and as a result of this is nonrotating.

For the same reason it is advantageous if the deflector according to the invention comprises a bearing ring with a through-opening in which the discharge pipe is slidably held so as to be nonrotating. This is, however, particularly advantageous only if the discharge pipe is extended rather than being hinged out.

Likewise, a nonrotating design is achieved by means of a bearing ring that is coupled to the discharge pipe, which bearing ring is slidably held in the bush in a nonrotating manner.

The object of the invention is further met by a method for leading fluids out from the interior of an aircraft, with the method comprising the steps of: opening a cover on the exterior structure of the aircraft; extending the deflector; holding the position of the deflector; and draining the fluid without wetting the exterior structure of the aircraft. Furthermore, it is advantageous if subsequently the deflector may be retracted and the cover may be closed.

BRIEF DESCRIPTION OF THE DRAWINGS

Further features, advantages and application options of the present invention are disclosed in the following description of the exemplary embodiments and of the figures. All the described and/or illustrated features per se and in any combination form the subject of the invention, also irrespective of their composition in the individual claims or their interrelationship. Furthermore, identical or similar components in the figures have the same reference characters. The following are shown:

DETAILED DESCRIPTION

FIGS. 1a to 2b show a deflector 2 from the state of the art, which deflector 2 may nor be extended. Consequently, the deflector 2 permanently causes an increase in the aerodynamic resistance of the aircraft. The deflector 2 comprises a discharge pipe 4 at the outlet end 6 of which a guiding plate 8 is arranged that is aligned obliquely relative to the exterior skin (not shown) of the aircraft. The fluid to be discharged is guided through the discharge pipe to the outlet end 6, from which it may exit to the environment of the aircraft. If the aircraft's airflow that results in flight extends from the left to the right in the drawing plane, as indicated by the direction of flight 10 that goes against the former, the fluid discharged from the discharge pipe 4 at its outlet end 6 is taken along by the air flow and is guided obliquely away from the outlet end 6, wherein the guiding plate 8 imparts to the fluid a speed component parallel to the discharge pipe 4.

FIGS. 2a and 2b show a further deflector 12 from the state of the art, in which deflector 12, however, a guiding plate 14 with an opening 16 is arranged on a discharge pipe 18. Through the opening 16, part of the flow that in the drawing plane is coming from the left is deflected, by the guiding plate 14, parallel to the discharge pipe with a speed component. The remaining part of the flow moves through the opening 16 and travels underneath the guiding plate 14 around the discharge pipe 18 essentially without any change in direction onwards along the exterior structure (not shown) of the aircraft. Consequently, a fluid emanating from the outlet end 20 is guided away from the exterior structure of the aircraft, while the deflector 12, however, at the same time has somewhat less air resistance than the deflector from FIGS. 1a and 1b.

For the sake of improved clarity in the description of the various exemplary embodiments, hereinafter in each case an illustration with the deflector retracted, i.e. in its so-called home position, is provided; and an illustration with the deflector extended, i.e. in its so-called activation position, is provided. Swinging-out or activating the deflectors, may in each case be carried out by an actuator, wherein the actuators are not shown in the basic illustrations of the individual exemplary embodiments.

Figure 3A:
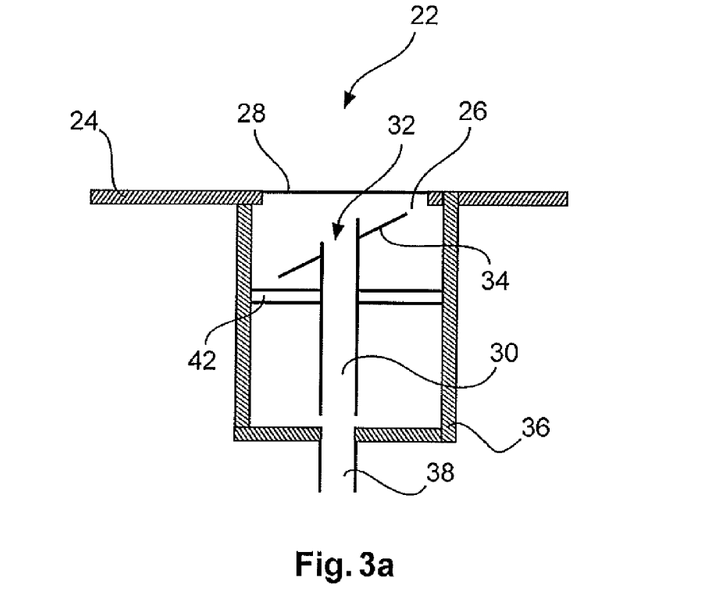
FIGS. 3a+b: a deflector according to the invention comprising an obliquely positioned guiding plate.

A first exemplary embodiment of a deflector 22 according to the invention is shown in FIG. 3a. On the exterior structure 24 of the aircraft there is an opening 26 that is closed by a cover 28. Underneath the cover 28 and the opening 26 there is a discharge pipe 30 at whose outlet end 32 a guiding plate 34 is arranged. Furthermore, the deflector 22 according to the invention comprises a housing 36 that carries out several functions. On the one hand the opening 26 is sealed off so that, in the case of pronounced differences in pressure between the environment and the interior of the aircraft, no air flows from the aircraft. On the other hand the closed housing 36 makes it possible to connect to the discharge pipe 30 a connection 38 for the fluid to be drained. Fluid flowing into the housing 36 reaches the discharge pipe 30 and from there, supported by an outward-acting pressure differential, by way of the outlet opening 32 reaches the environment.

Figure 3B:
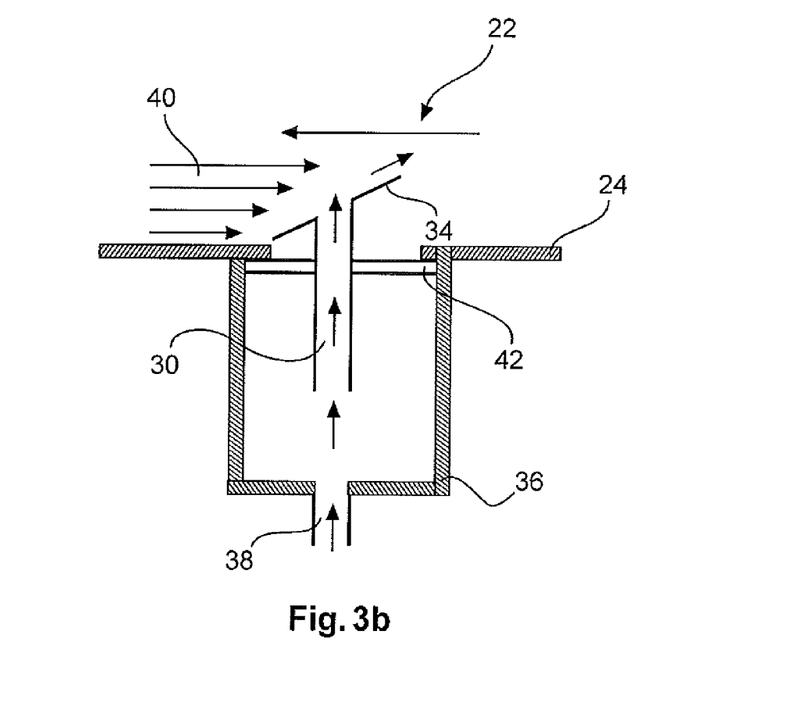

With the deflector 22 according to the invention activated, as shown in FIG. 3b, the fluid to be released is forced, by the deflector 34, from the flow boundary layer 40 that is present at the exterior structure 24, so that the fluid may not contact the exterior structure 24, thus soiling or damaging it. Swinging-out of the discharge pipe 30 takes place by means of an actuator not shown in detail, whose possible designs will be described below after the various exemplary embodiments. In the exemplary embodiment currently presented, on the discharge pipe 30 underneath the guiding plate 34 there is furthermore a ring-shaped end stop 42 which, when the deflector 22 according to the invention is fully activated, with the discharge pipe 30 extended conforms to the inside of the exterior structure 24 of the aircraft. The deflector 22 according to the invention is thus in its activation position in which further swinging out of the discharge pipe 30 and of the guiding plate 34 is prevented.

Figure 4A:
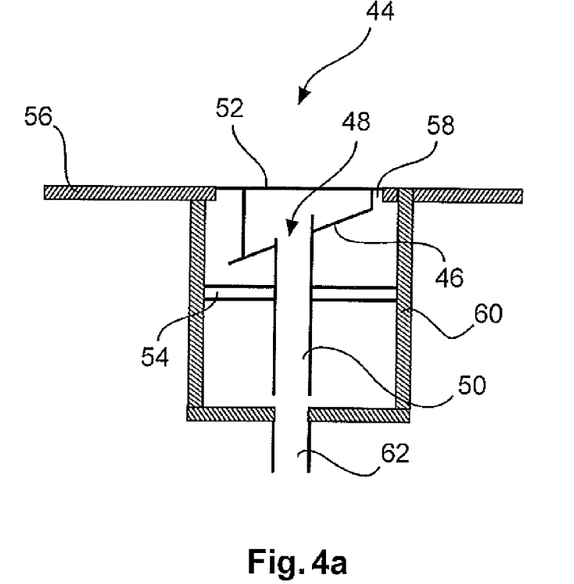
FIGS. 4a+b: a deflector according to the invention comprising an integrated cover and an obliquely positioned guiding plate.
Figure 4B:
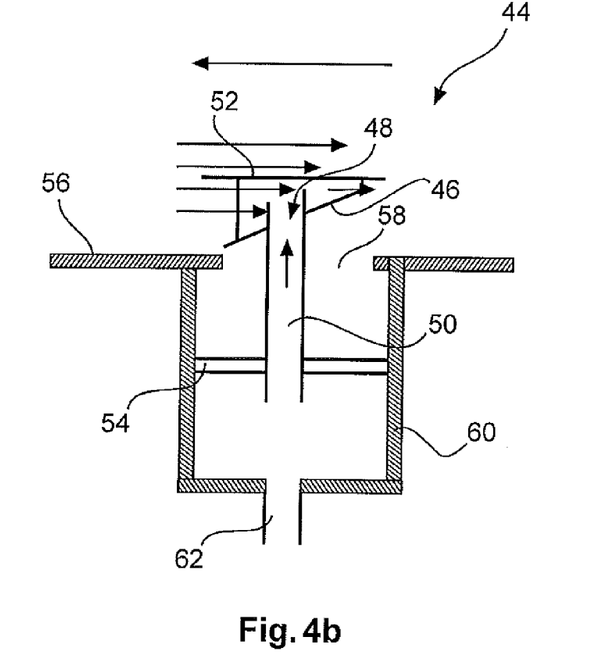

FIGS. 4a and 4b show a further exemplary embodiment of a deflector 44 according to the invention. The deflector 44 is designed in a manner that is similar to that of the deflectors 22 from FIGS. 3a and 3b, except that in the present embodiment a guiding plate 46 is arranged at the outlet end 48 of the discharge pipe 50, with said guiding plate 46 also incorporating a cover 52. Consequently the cover 52 may be automatically removed when the deflector 44 is activated, and, if desired, may optionally be closed when the deflector 44 according to the invention moves back to its home position. A ring-shaped end stop 54 could furthermore conform to the exterior structure 56 underneath the opening 58 when the discharge pipe 50 for normal operation of the deflector 44 according to the invention is completely extended, provided no alternative retaining means for retaining the deflector 44 in its swung-out form are provided on the housing 60.

FIG. 4b shows the deflector 44 according to the invention in its activation position, in which the fluid to be discharged, by way of a connection 62 on the underside of the housing 60, reaches the environment by way of the discharge pipe 50. In contrast to this, FIG. 4a shows the deflector 44 according to the invention in its home position.

Figure 5A:
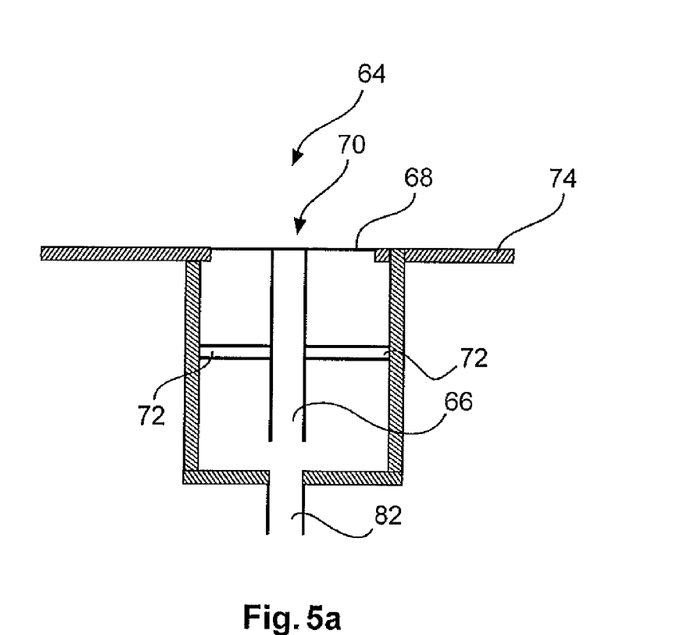
FIGS. 5a+b: a deflector according to the invention comprising a cover as a guiding plate.
Figure 5B:
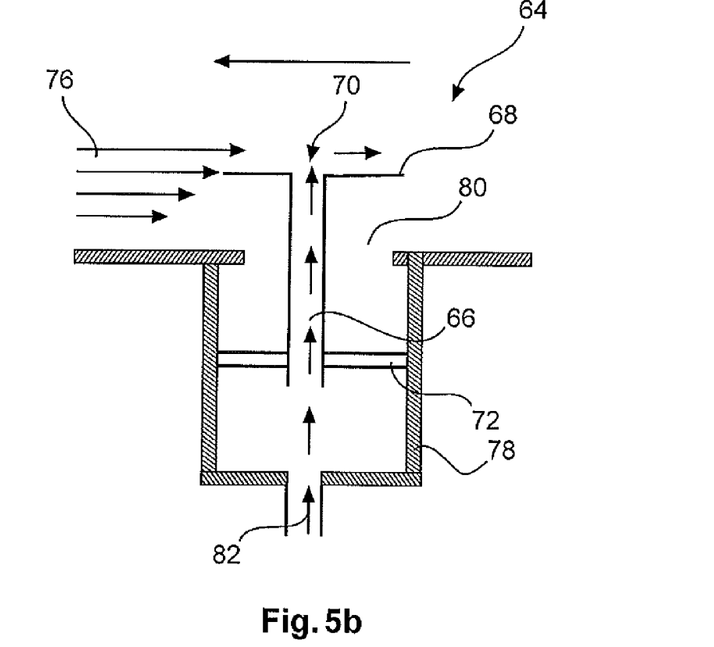

FIGS. 5a and 5b show a further exemplary embodiment of a deflector 64 according to the invention, which deflector 64 is designed in a relatively simple manner. The deflector 64 according to the invention comprises a discharge pipe 66 and a cover 68 that is arranged at the outlet end 70 of the discharge pipe 66. On the discharge pipe 66 there is a ring-shaped end stop 72 which might be able to contact the exterior structure 74 of the aircraft when the deflector is in its activation position. In this exemplary embodiment shown, the cover 68 is at the same time used as a guiding plate that conveys the fluid emanating from the discharge pipe 66 if at all possible from the exterior structure 74 of the aircraft, away from the flow boundary layer 76 on the exterior structure 74 of the aircraft. In the deflector 64 according to the invention, as shown in this embodiment, too, there is a housing 78 underneath an opening 80, which housing 78 is connected to a connection 82 for the fluid to be discharged.

Figure 6A:
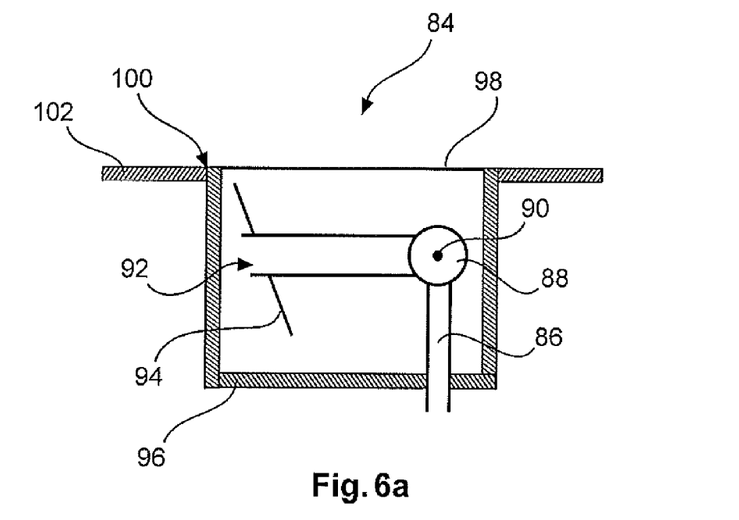
FIGS. 6a+b: a further embodiment of a deflector according to the invention, comprising a guiding plate.
Figure 6B:
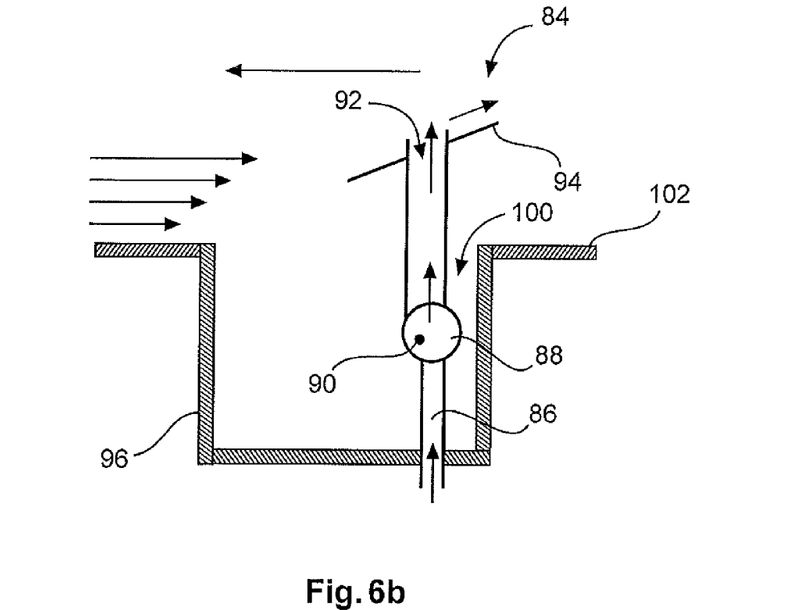

FIGS. 6a and 6b show a further modification. In this embodiment a deflector 84 according to the invention comprises a discharge pipe 86, which by way of a swivel joint 88 is held so as to be hingeable on a rotary axis 90. At the outlet end 92 there is a guiding plate 94. A housing 96 for receiving the discharge pipe 86 and the guiding plate 94 is designed so as to be somewhat larger than is the case in the exemplary embodiments shown above. This is because with a discharge pipe 86 that is hinged by 90° a larger design space is required for the deflector 84 according to the invention than is the case with merely a vertically movable discharge pipe. In the home position shown in FIG. 6a, the cover 98 is positioned so as to be flush in an opening 100 of the exterior structure 102 of the aircraft, and, for example, if the discharge pipe 86 is in its activation position, could have been pushed away or blasted away, as shown in FIG. 6b. This provides an advantage in that consequently the cover 100 then does not require its own actuator for swinging out or opening, and furthermore because a missing cover 100 provides ground personnel already with an obvious indication of a fault having occurred on board the aircraft.

Figure 7A:
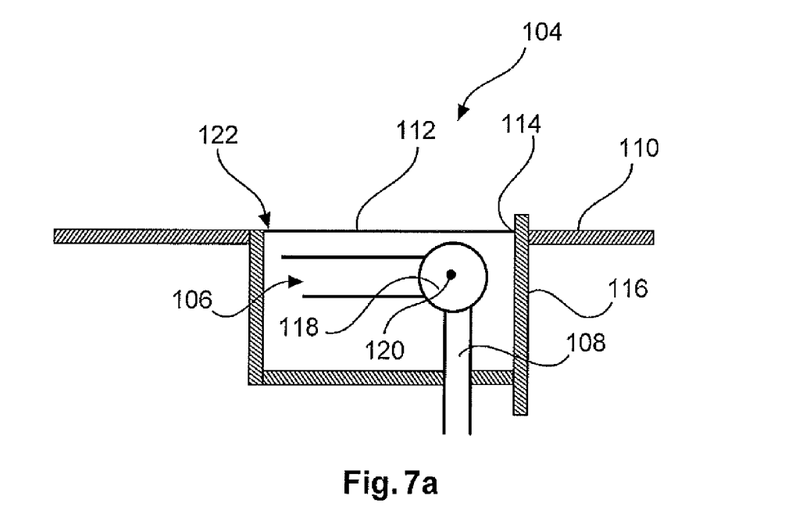
FIGS. 7a+b: a further embodiment of a deflector according to the invention, comprising a cover as a guiding plate.
Figure 7B:
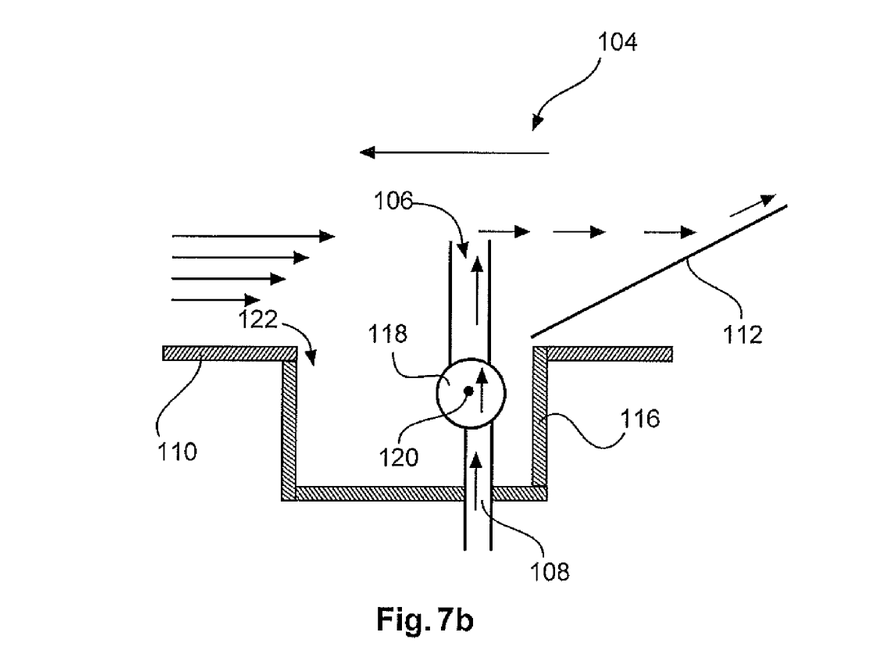

FIGS. 7a and 7b show a further exemplary embodiment of a deflector 104 which is basically similar to the deflector 84 according to the invention from FIGS. 6a and 6b. There is, however, a main difference in that the deflector 104 does not comprise a dedicated guiding plate. When the discharge pipe 108 is hinged out by 90°, the outlet end 106 is exposed to the flow on the exterior structure 110 of the aircraft, wherein the cover 112 may, however, be hingeably held on a hinge point 114 so that the cover in its hinged-out state 112 serves as a guiding plate, as shown in the activation position illustrated in FIG. 7b. This deflector 104 according to the invention provides an advantage in that, for example, the housing 116 requires less design space than does the corresponding exemplary embodiment shown in FIGS. 6a and 6b. In the present exemplary embodiment the discharge pipe 108 furthermore also comprises a swivel joint 118 with a pivot point 120 so that the discharge pipe 108 may be hinged from the opening 122 of the exterior structure 110 into the surroundings.

Figure 8A:
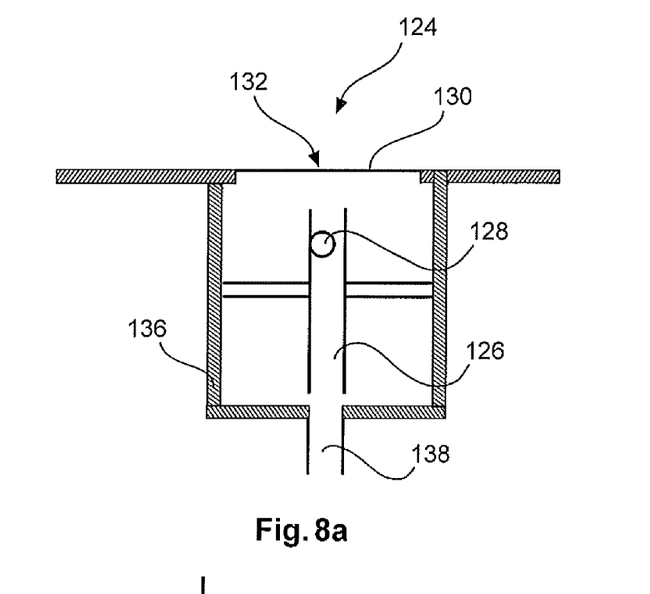
FIGS. 8a–c: a further embodiment of a deflector according to the invention, comprising a cover as a guiding plate.
Figure 8B:
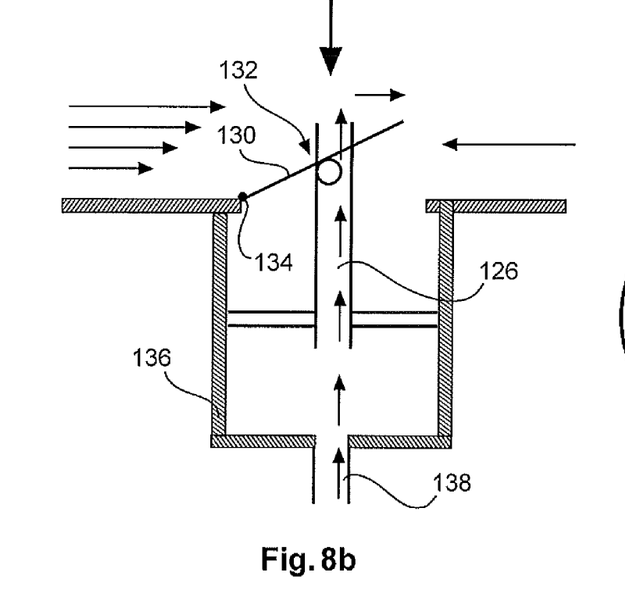
Figure 8C:
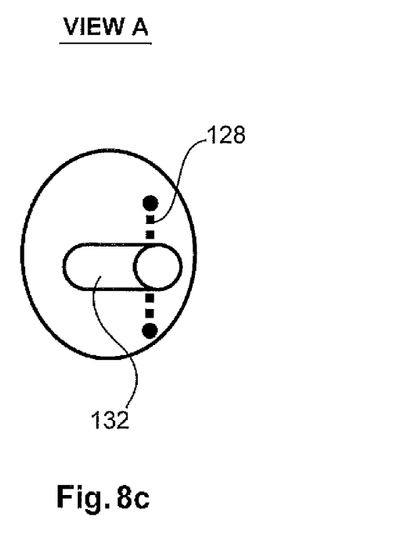

As a further exemplary embodiment, FIGS. 8a-c show a deflector 124 according to the invention, which deflector comprises a discharge pipe 126 on which at least one pin 128 that is arranged transversely to it is positioned, which pin 128 during swinging out of the discharge pipe 126 lifts or hinges the cover 130 by a certain distance. To this effect the cover 130 comprises an elongated hole 132 through which the discharge pipe 126 may be placed. Therefore the cover 130 is preferably hingeably held on an upstream hinge point 134, thus serving as a guiding plate when the discharge pipe 126 is extended. The deflector 124 according to the invention also comprises a housing 136 which comprises a connection 138 for fluid to be discharged.

Figure 9A:
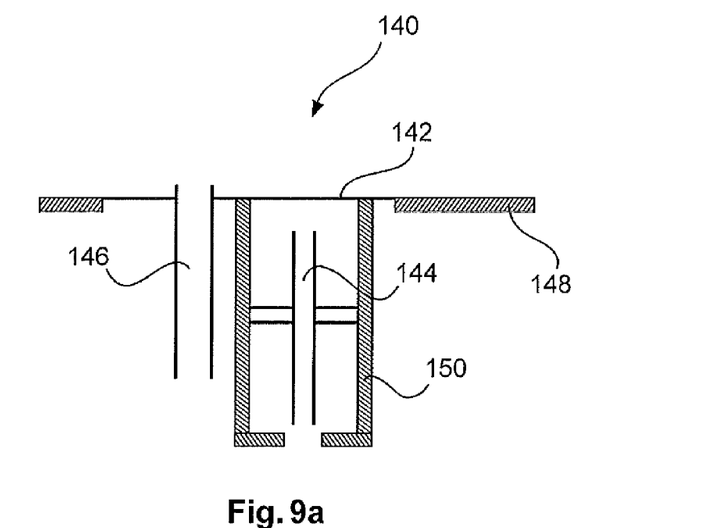
FIGS. 9a+b: a further embodiment of a deflector according to the invention, comprising a cover as a guiding plate.
Figure 9B:
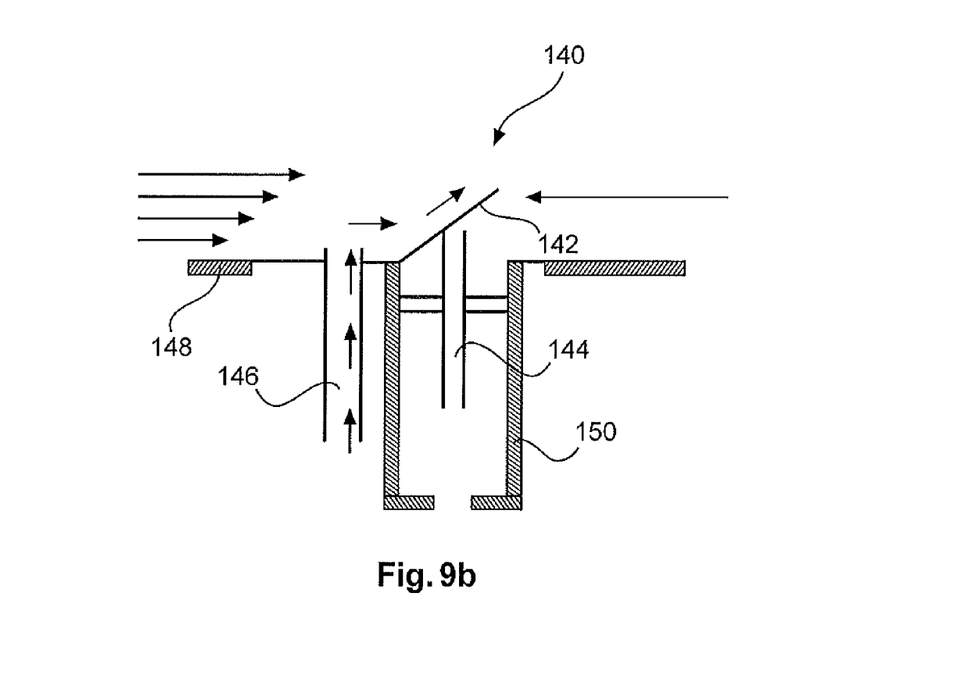

FIGS. 9a and 9b show a further modified deflector 140 according to the invention, in which a separation of the functions for swinging out a cover 142 is carried out by a piston 144 or the like, while the discharge pipe 146 is arranged, so as to be spaced apart, in the exterior structure 148 of the aircraft. In the activation position shown in FIG. 9b, the cover 142 is open, and the fluids that issue upstream thereof are guided away from the exterior structure 148 of the aircraft as if they were on a ramp. The housing 150 of the deflector 140 is not involved in any onward-conveyance of fluids to be released to the discharge pipe 146.

In a way that is analogous to the exemplary embodiment from the above FIGS. 3a and 3b, FIGS. 10a and 10b show a deflector 152 with an actuator 154, which is used to swing out the discharge pipe 156. It should be mentioned that the actuator 154 is not limited to the exemplary embodiment shown in FIGS. 3a and 3b. Instead, as a result of the similar construction of the various exemplary embodiments it is imaginable that the actuator 154 may be used for all the exemplary embodiments so that separate presentation of the modified deflectors and of the actuator 154 is considered to be sensible. It is only for the sake of providing a better understanding that the actuator in the following descriptions of the figures is restricted to a single exemplary embodiment.

Figure 10A:
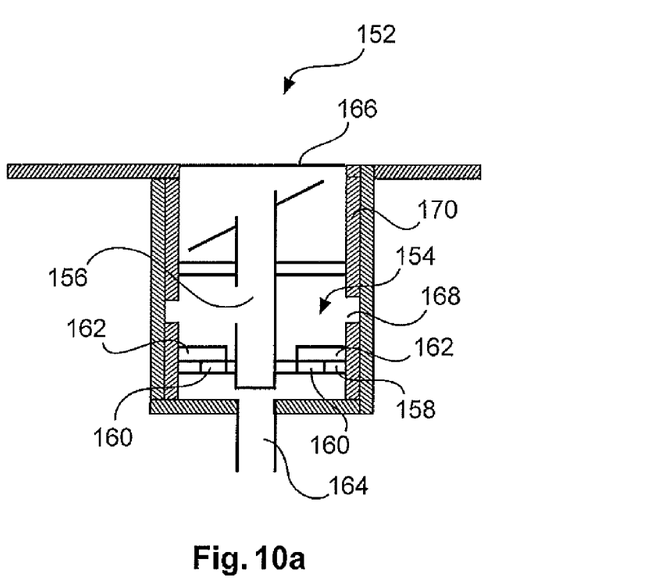
FIGS. 10a+b: an actuator for swinging out a deflector according to the invention.
Figure 10B:
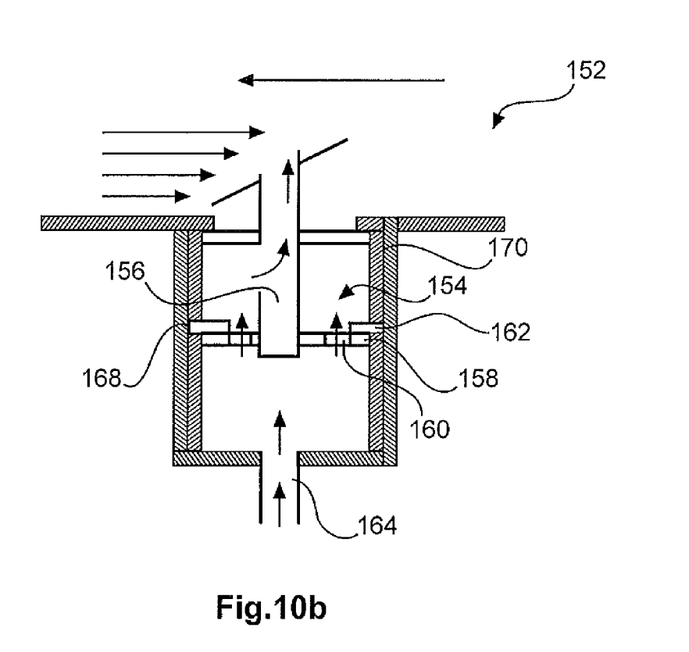

The actuator 154 comprises a piston 158 which has through-openings 160, which in the home position shown in FIG. 10a are closed by sliders 162. By impinging the piston 158 with pressure from a fluid to be discharged, which fluid is present at a connection 164, the piston 158 moves in the direction of the cover 166. In this exemplary embodiment the piston 158 comprises two sliders 162 which are preferably spring-loaded and are arranged in grooves of the piston 158. This arrangement comprising pistons 158 and sliders 162 is hereinafter also referred to as a "piston assembly". Due to spring tension, the sliders 162 move radially outward during relief. When the piston 158 moves upwards towards the cover 166, the sliders 162 lock into place in grooves 168 of the bush 170 and hold the discharge pipe 156 firmly in this position. In this way the activation position shown in FIG. 10b is reached, in which position the fluid to be discharged may be released to the environment of the aircraft. When the sliders 162 are locked into place, the through-openings 160 in the piston are opened, and consequently the fluid to be released may flow through the piston to the outlet opening of the discharge pipe 156 and to the environment.

Figure 11A:
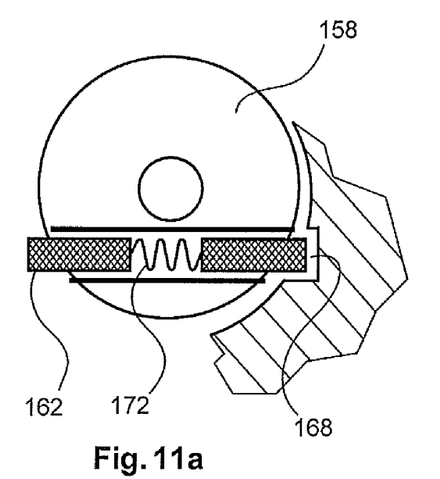
FIGS. 11a+b: a detailed view of the piston assembly of the actuator from FIGS. 10a+b.
Figure 11B:
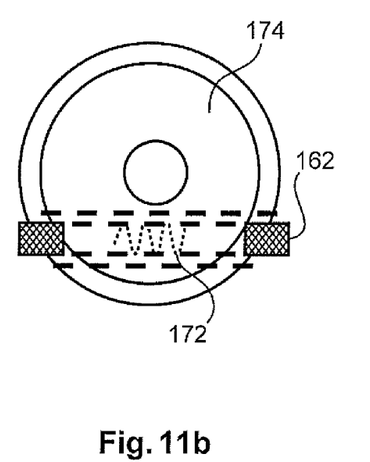

FIGS. 11a and 11b show a diagrammatic view of the way the sliders 162 are arranged on the piston 158. Between the sliders 162, for example, a pressure spring 172 is located, which in the installed state when the piston 158 is situated in the bush 170 is continuously under tension. Consequently, when the sliders 162 reach the grooves 168 said sliders 162 are pushed outwards and lock into position in said location, or come to rest against an upper opening edge of the grooves 168. FIG. 11b further shows that the arrangement of sliders 162 may be screwed at a position underneath a cover plate 174. In this way a situation may be prevented in which the sliders 162 and/or the pressure spring 172 could jump out or fall out of their/its intended positions/position; i.e. an improved guide for the sliders 162 may be implemented.

Figure 12A:
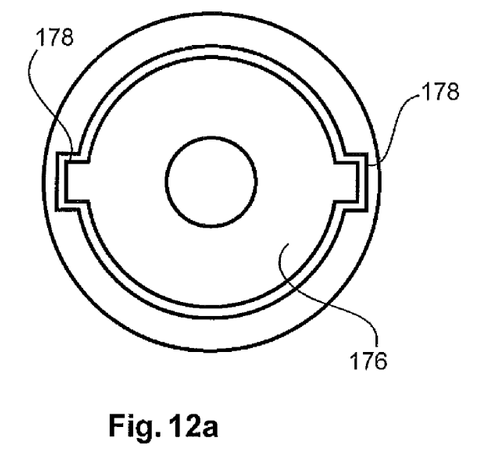
FIGS. 12a+b: a diagrammatic view of a nonrotation device by means of a bearing ring for the actuator from FIGS. 10a+b.

FIG. 12a further shows a proposed nonrotation device of the piston 158 or of the discharge pipe 156 by means of a groove guide. In this arrangement the nonrotation device is preferably implemented by way of a bearing ring 176 which is rigidly installed on the discharge pipe 156. Due to its tubular character, the assembly comprising the discharge pipe 156, piston assembly and bearing ring 176 may hereinafter also be referred to as the "tubular assembly". In the region of the bearing ring 176, the bush 170 comprises two grooves 178 in which the bearing ring 176 is guided in a nonrotating manner. In this way it may be ensured that the piston assembly may be installed exclusively in the desired alignment which then also ensures nonrotation. A nonrotation device by way of the bearing ring 176 further provides an advantage in that no additional places of leakage arise.

Figure 12B:
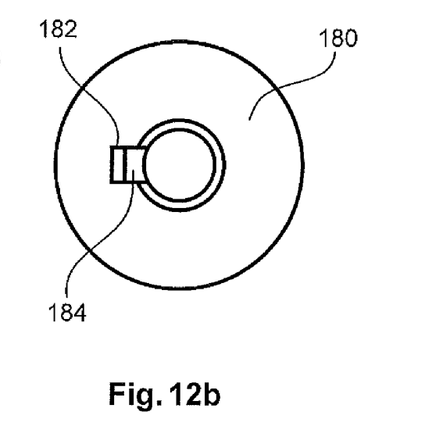

If a bearing ring 180 from FIG. 12b is rigidly connected to the bush 170, and if the discharge pipe 156 is situated in the bearing ring 180, the through-opening in the bearing ring, through which the discharge pipe 156 moves needs to comprise a groove 182. The discharge pipe 156 then comprises a correspondingly arranged tongue 184 and thus establishes a tongue-and-groove connection with the groove 182. This variant, too, ensures reliable installation, nonrotation and the absence of additional places of leakage.

Optionally, nonrotation may also be ensured by the piston 158, wherein the bush 170 then requires a through-groove parallel to the longitudinal axis of the piston assembly. The slider or sliders 162 travels/travel in this groove to any piston position. In order to prevent incorrect assembly of the tubular assembly, the sliders 162 always project somewhat beyond the diameter of the piston 158, even if the sliders are completely retracted. With this variant, too, it may be ensured that the piston assembly is always installed in the desired alignment, which in turn ensures nonrotation.

In order to ensure safe locking into place of the sliders 162, preferably the cylindrical region in which the bearing ring 180 travels may comprise a smaller diameter than the diameter of the region in which the piston 158 moves. This feature further prevents any unintended falling out of the tubular assembly.

Figure 13:
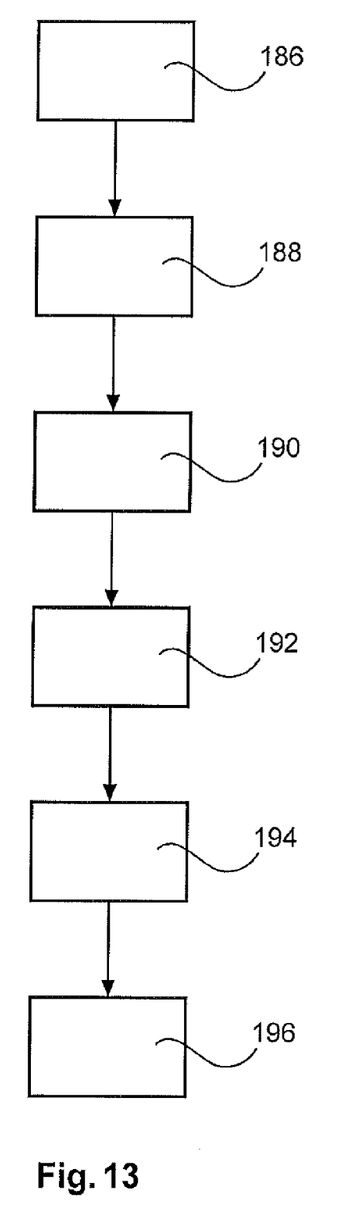
FIG. 13: a diagrammatic view of the method according to the invention.

Finally, FIG. 13 shows the method according to the invention for discharging fluids from the interior of an aircraft. After opening 186 a cover at the exterior structure of the aircraft, swinging out 188 the deflector, retention 190 of the position of the deflector, and drainage 192 of the fluid take place without the exterior structure of the aircraft becoming wet. Furthermore, it is advantageous if subsequently the deflector may be swung back 194 and the cover may be closed 196.

In summary it should be stated that the deflector according to the invention comprises a number of advantages when compared to known deflectors. The deflector according to the invention is designed to be extended and used only in the case of an emergency, i.e. if there is a need to discharge fluid. At all other points in time the deflector according to the invention is situated within the structure of the aircraft, and thus does not cause any increased aerodynamic resistance.

In addition, it should be pointed out that "comprising" does not exclude other elements or steps, and "a" or "one" does not exclude a plural number. Furthermore, it should be pointed out that features or steps which have been described with reference to one of the above exemplary embodiments may also be used in combination with other features or steps of other exemplary embodiments described above. Reference characters in the claims are not to be interpreted as limitations.

List of Reference Characters
2 Deflector (state of the art, SA)
4 Discharge pipe (SA)
6 Outlet end (SA)
8 Guiding plate (SA)
10 Direction of flight (SA)
12 Deflector (SA)
14 Guiding plate (SA)
16 Opening (SA)
18 Discharge pipe (SA)
20 Outlet end (SA)
22 Deflector
24 Exterior structure
26 Opening
28 Cover
30 Discharge pipe
32 Outlet end
34 Guiding plate
36 Housing
38 Connection
40 Flow boundary layer
42 End stop
44 Deflector
46 Guiding plate
48 Outlet end
50 Discharge pipe
52 Cover
54 End stop
56 Exterior structure
58 Opening
60 Housing
62 Connection
64 Deflector
66 Discharge pipe
68 Cover
70 Outlet end
72 End stop
74 Exterior structure
76 Flow boundary layer
78 Housing
80 Opening
82 Connection
84 Deflector
86 Discharge pipe
88 Swivel joint
90 Rotary axis
92 Outlet end
94 Guiding plate
96 Housing
98 Cover
100 Opening
102 Exterior structure
104 Deflector
106 Outlet end
108 Discharge pipe
110 Exterior structure
112 Cover
114 Hinge point
116 Housing
118 Swivel joint
120 Pivot point
122 Opening
124 Deflector
126 Discharge pipe
128 Pin
130 Cover
132 Elongated hole
134 Centre of gravity
136 Housing
138 Connection
140 Deflector
142 Cover
144 Piston
146 Discharge pipe
148 Exterior structure
150 Housing
152 Deflector
154 Actuator
156 Discharge pipe 158 Piston
160 Through-opening
162 Slider
164 Connection
166 Cover
168 Groove
170 Bush
172 Pressure spring
174 Cover plate
176 Bearing ring
178 Groove
180 Bearing ring
182 Groove
184 Tongue

The invention claimed is:

1. A deflector for an aircraft, comprising:
a discharge pipe for leading a fluid to be drained from the aircraft by way of an outlet end to the environment of the aircraft,
an actuator, coupled to the discharge pipe for swinging out, when required, the discharge pipe to at least one activation position,
wherein in the at least one activation position the outlet end is arranged so as to be spaced apart from the exterior skin of the aircraft, and the deflector guides the fluid to be drained so that it exits outside a flow boundary layer that is present on the exterior skin,
wherein the actuator comprises an axially slidably supported piston that is designed to be moved by the fluid to be discharged, so as to extend the discharge pipe.

2. The deflector of claim 1, further comprising a cover, wherein in a home position the discharge pipe is positioned within a contour of the aircraft, underneath the cover, which contour is flush with the contour of the aircraft.

3. The deflector of claim 2, wherein the cover is movably held so as to uncover an opening for the discharge pipe.

4. The deflector of claim 2, wherein the cover is designed such that in the at least one activation position of the deflector it assumes the function of a guiding plate for discharging the fluid to the flow field such that the exterior skin of the aircraft does not become wet.

5. The deflector of claim 2, wherein the cover further comprises ventilation slots.

6. The deflector of claim 2, wherein the cover for opening and/or closing is coupled with the actuator.

7. The deflector of claim 1, wherein the piston comprises at least one indentation in which at least one radially-movable slider is arranged which, when the at least one activation position of the discharge pipe has been reached, locks into place in the corresponding at least one indentation of a bush that encloses the piston.

8. The deflector of claim 7, wherein the piston further comprises at least one through-opening that is postioned in such a way that in a home position of the deflector the at least one slider covers the at least one through-opening, and in the at least one activation position uncovers the at least one through-opening.

9. The deflector of claim 7, wherein the at least one slider is slidably held in at least one groove that extends parallel to a longitudinal axis of th piston.

10. The deflector of claim 7, further comprising a bearing ring that is coupled to the discharge pipe, which bearing ring is slidably held in the bush so as to be nonrotating.

11. The deflector of claim 1, wherein the piston is movable in two directions.

12. The deflector of claim 1, further comprising a guiding plate in order to let off into the flow field the fluid to be discharged in such a way that the exterior skin of the aircraft does not become wet.

13. The deflector of claim 1, wherein the discharge pipe comprises at least one swivel joint and is designed to be hinged, on its rotary axis, to the at least one activation position.

14. The deflector of claim 1, further comprising a bearing ring with a through-opening in which the discharge pipe is slidably held so as to be nonrotating.

15. The use of a deflector of claim 1 in an aircraft.

16. An aircraft comprising at least one deflector, the deflector comprising:
a discharge pipe for leading a fluid to be drained from the aircraft by way of an outlet end to the environment of the aircraft,
an actuator, coupled to the discharge pipe for swinging out, when required, the discharge pipe to at least one activation position,
wherein in the at least one activation position the outlet end is arranged so as to be spaced apart from the exterior skin of the aircraft, and the deflector guides the fluid to be drained so that it exits outside a flow boundary layer that is present on the exterior skin,
wherein the actuator comprises an axially slidably supported piston that is designed to be moved by the fluid to be discharged, so as to extend the discharged pipe.

* * * * *

UNITED STATES PATENT AND TRADEMARK OFFICE
CERTIFICATE OF CORRECTION

| | | |
|---|---|---|
| PATENT NO. | : 8,313,062 B2 | |
| APPLICATION NO. | : 12/534997 | |
| DATED | : November 20, 2012 | |
| INVENTOR(S) | : Piesker | |

It is certified that error appears in the above-identified patent and that said Letters Patent is hereby corrected as shown below:

In the Claims

Column 12, line 13, claim 9, "th" should read -- the --.

Signed and Sealed this
Eighteenth Day of August, 2015

Michelle K. Lee
*Director of the United States Patent and Trademark Office*